United States Patent Office 3,430,721
Patented Mar. 4, 1969

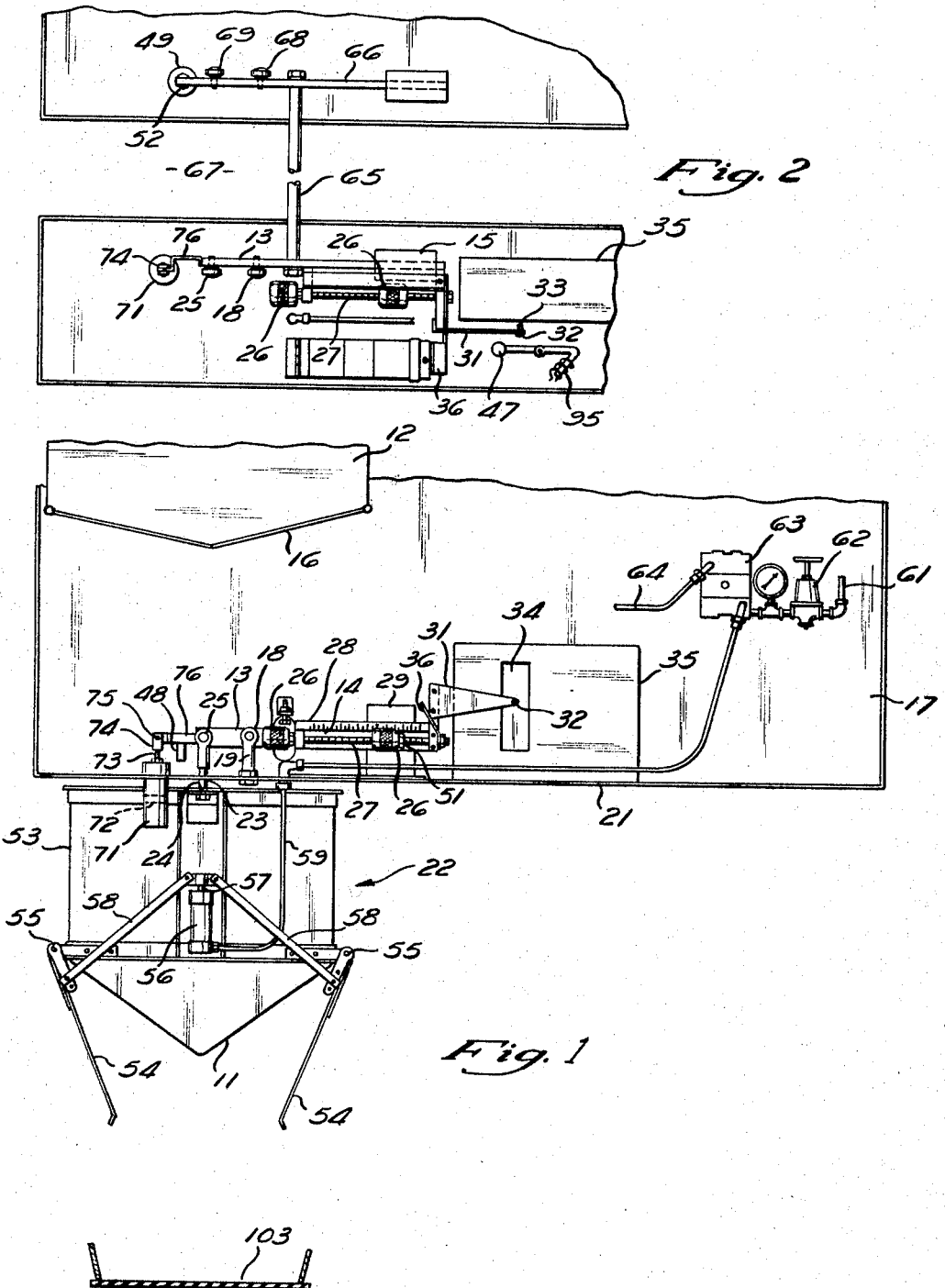

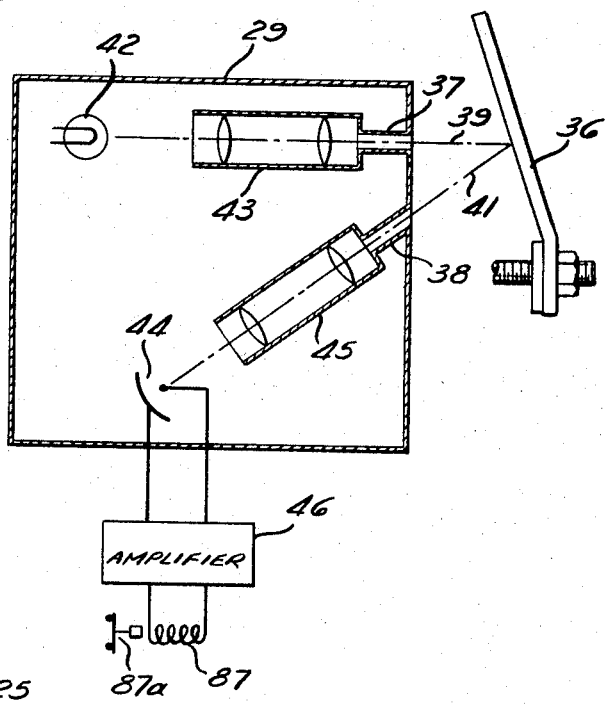
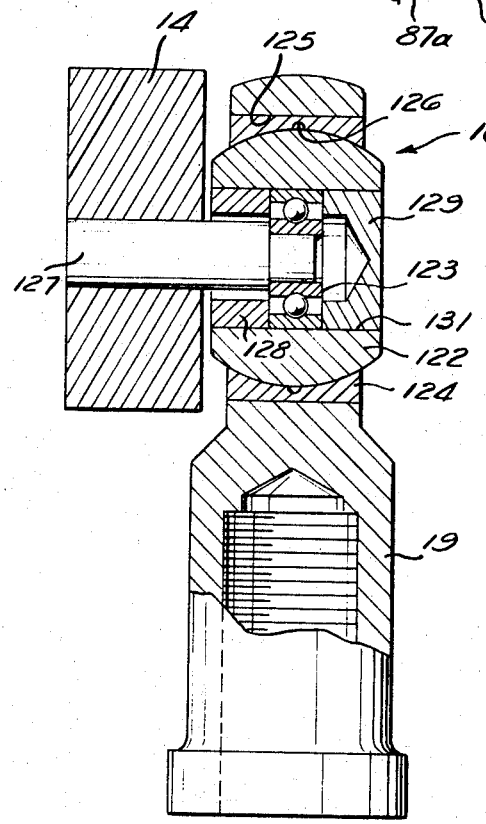

3,430,721
WEIGHT RECORDERS
Allen Harmon and Benjamin Gause, Mauldin, S.C., assignors to Crompton & Knowles Corporation
Continuation of application Ser. No. 582,014, Sept. 26, 1966. This application Jan. 3, 1967, Ser. No. 613,706
U.S. Cl. 177—2
Int. Cl. G01g 23/38
26 Claims

ABSTRACT OF THE DISCLOSURE

Automatic weighing apparatus, particularly for textile fibers, with a chart to record deviations in the weights of batches of material discharged by the apparatus. There is a balance beam with a center of gravity lower than the pivot point of the balance beam and mechanism for discharging material from a scale pan when the balance beam comes to a substantially horizontal position and simultaneously marking on the chart the actual position of the balance beam to indicate how much the actual weight of the batch deviated from the batch weight for exact balance of the beam in a horizontal position.

---

This application is a continuation of a co-pending application Ser. No. 582,014 filed Sept. 26, 1966, now abandoned.

Description

This invention relates to weight recorders and concerns particularly apparatus for providing records automatically of the weights of successive batches of material delivered in automatic weighing systems.

An object of the invention is to provide a record of deviations from the weights of the batches of material for which the apparatus is designed to discharge, particularly to record any overweights in batches successively delivered.

A further object of the invention is to enable a sensitive balance beam system of weighing to be employed for small light weight batches and to produce records of the weights without interference with the operation of the scale beam and to overcome the effects of oscillation of the scale beam before attaining its final balance position.

A further object of the invention is to avoid the production of any frictional or inertia effects in the operation of sensitive balance beam weighing mechanism.

Still another object of the invention is to enable small deviations in the desired batch weight to be indicated and recorded by deviations from the exact horizontal position of the balance beam.

A further object of the invention is to facilitate the computation of the actual percentage of each component of fibers in a total blend delivered by a plurality of automatic fiber weighing machines.

Other and further objects, features and advantages of the invention will become apparent as the description proceeds.

Turning now to the invention in the preferred form thereof, for each fiber feeder, there is an automatic fiber weighing mechanism which not only weighs out a batch of fiber of the weight desired for which the machine is set but produces a record on a chart of the actual weight of the batch so that any deviations from average batch weight can be ascertained.

Any suitable type of feeders may be employed as these do not constitute a part of the present invention. For example, feeders may be installed along a conveyor system such as the system illustrated in Patent 2,703,438 issued Mar. 8, 1955 to O. W. Greene, R. W. Twitty, and T. L. Richie, or in the application constituting a continuation in part thereof, corresponding to British patent specification No. 977,615. Under each feeder there is a valve door or supply gate, and under the valve door is a scale pan. The latter is so arranged as in the apparatus used heretofore that the weighed batch may be discharged after the weighing has been completed. However, with the present apparatus a record is made of the weight before the batch is discharged.

The scale pan is suspended from one end of the balance beam which carries an adjustable balance weight at the other end so that the apparatus may be adjusted to operate at the desired weight of a batch of material in the scale pan. In order to avoid subjecting the balance beam to any friction or inertia effects, photoelectric responsive apparatus is employed for detecting the rise of the balance beam, indicative of the fact that the balance weight and the quantity of material in the scale pan are in balance and that the desired weight of the batch of material has been delivered to the scale pan. Apparatus responsive to the photoelectric responsive mechanism is provided for closing the valve gate to prevent the delivery of any more material to the scale pan and then producing a record of the position of the balance weight after sufficient time delay to permit oscillations of the balance beam to be damped out.

A weight extending vertically from the balance beam is mounted thereon so that the horizontal distance between the center of gravity of the balance beam and its pivot point is dependent upon the extent of deviation of the position of the balance beam from horizontal. In this way the angular position of the balance beam when it is in balance is indicative of any deviations of the actual weight of the batch of materal on the scale pan from which the weight would be with the balance beam in balance in a precisely horizontal position. Consequently, the vertical position of the balance beam provides a measure of the actual weight of the batch in the scale pan when the photoelectric responsive mechanism has tripped the apparatus to weigh out the batch. Marks produced on the chart by pressing a recording stylus carried on the end of the balance beam against a chart automatically provide a record of the batch weights.

Mechanism is provided for opening the scale pan and discharging the batch and advancing the recorder chart after each record of a batch weight has been made.

A better understanding of the invention will be afforded by the following detailed description considered in conjunction with the accompanying drawings in which FIG. 1 is a fragmentary view in elevation of an automatic fiber weight recorder in accordance with the invention.

FIG. 2 is a plan view of the apparatus of FIG. 1.

FIG. 4 is a circuit diagram of unitary photoelectric response apparatus.

FIG. 5 is a view of a section cut by a vertical plane through the balance beam support bearing assembly.

Figure 3:
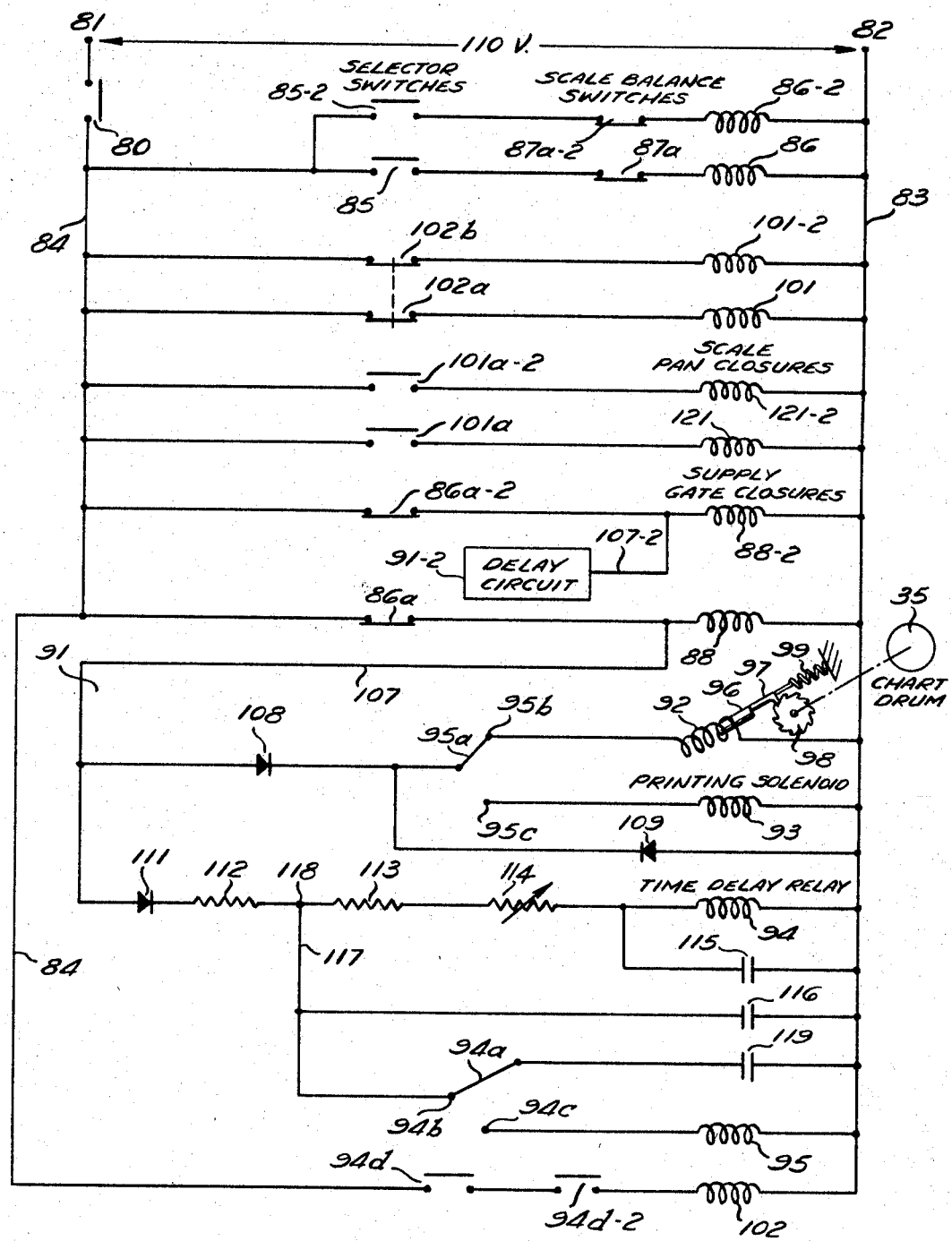
FIG. 3 is a simplified circuit diagram of the electrical control apparatus of the mechanism, including a circuit diagram of the circuit for controlling the record printer and chart advancing mechanism with a delay circuit for permitting damping of oscillation of the weigh beam before printing the record.

The weight recording apparatus illustrated and described is particularly designed to handle low density bulk materials such as natural and synthetic textile fibers. It is likewise capable of handling coarse granular materials of low density. For convenience, it will be described as employed in a textile mill. In textile mills employing automatic weighing there are several feeders of different kinds of fibers each supplying fiber to a weigh box set so as to produce the desired blend. For example, on a 5000 pound total blend of 50% viscose and 50% acetate, using four machines (two of the machines having viscose in them and two acetate, and all set for 16 oz. each) a printed chart giving the actual weights of each of the machines on each series of dumps to the total blend desired, gives the mill supervision of the actual record of that blend before it was subsequently processed in the mill and resulted in filling bands due to improper proportioning. There has long been a need for a method of recording individual weights of each fiber meter in the line so that the textile mill would have a printed record of the actual dumpings from all the machines in the line and could then compute the actual percentage of each component of fibers in each of the machines making up the total blend of all the machines.

Heretofore the accepted method has been to stop the line of machines and to make manual check weighings of each of the machines by having them discharge, collecting the contents, and weighing them on a conventional type scale for that purpose, to check the actual weight against the set weight. In accordance with the invention it is possible for the operator merely to examine this strip chart recorder periodically, and at the end of the run there will be a permanent record of the run.

One of the problems heretofore has been that in using a simple scale balance that trips when the scale arm reaches a certain position, actuating a mercury switch which stops the machine, the weighing system prevents short weights, but does not prevent over weights.

FIGURES 1 and 2 illustrate one of the recording weigh boxes in accordance with the invention which would be employed in conjunction with one of the textile feeders of a certain type of fiber. It will be understood that similar recording weigh boxes are employed for each of the feeders.

Each weigh box includes an openable scale pan 11 mounted below the outlet of the feeder 12 for discharging material to be weighed. The scale pan 11 is supported by one arm 13 of scale beam means 14 carrying a counter weight 15 at the opposite end. The arrangement is such that, as in weigh boxes heretofore employed, when the material deposited in the weigh pan 11 has reached the weight for which the mechanism is set, the balance weight end of the scale beam 14 rises and trips a supply gate or valve door 16 interposed between the feeder 12 and the scale pan 11.

The weighing and recording mechanism is mounted within a housing 17 shown fragmentarily with the cover and printer striker removed in order to expose the interior of the apparatus. The scale beam 14 is pivotally supported by means of a pivot bearing assembly 18 carried by post 19 which is secured to the lower wall 21 of the housing 17. The scale pan 11 is part of an assembly 22 supported by means of a rod 23 extending through an opening 24 in the wall 21 and pivotally connected to the weigh arm 13 of the scale beam 14 by another pivot bearing assembly 25. The weight of the counter weight 15 is selected according to the size of the machine so that when the desired weight of material is on the scale pan 11, the beam will be approximately in balance.

For more precisely adjusting the weight of material in the batch for which the scale beam is in balance, trim weights 26 are provided which are horizontally movable along the scale beam 14. For enabling the horizontal adjustment to be made readily, the trim weights 26 have a threaded bore mating a threaded rod 27 secured to the scale beam 14 and cooperating with a calibrated strip 28 also secured to the scale beam and carrying suitable graduations calibrated in terms of the weight on the pan 11.

The arrangement is such that when there is no material on the scale pan 11, the beam is out of balance and the right hand end sags below the normal horizontal position. However, when the requisite weight has been deposited in the scale pan 11, the scale beam rises to a predetermined position substantially horizontal and two actions take place. One is the closing of the supply gate 16 and the other is the production of a printed record of the actual weight of material on the scale pan 11. As will be explained more fully hereinafter, photoelectric response mechanism mounted within a housing 29 is utilized for accomplishing these actions without placing a weight upon the scale beam 14 or introducing friction or inertia effects.

For enabling a printed record to be produced, a pennant 31 is mounted at the right hand end of the scale beam 14 and carries at its right hand end a stylus 32 in the form of a screw having a marking tip or point 33. To cooperate with the marking tip 33 a chart 34 is mounted upon a movable drum or chart carriage of the like 35.

In order that the mechanism will trip when the scale beam 14 has risen to a predetermined position, preferably horizontal, without applying any force to the scale beam or introducing retarding friction, a mirror 36 is mounted upon the end of the scale beam 14 and the photoelectric response housing 29 is provided with two apertures 37 and 38 for an incident light beam 39 and a reflected light beam 41, respectively. A lamp 42 is provided and a suitable collimating tube 43, containing focusing lenses, is mounted between the lamp 42 and the aperture 37 in the line of the incident light beam 39.

A photoelectric responsive element such as a phototube 44 is mounted in the casing 29 in such a position as to receive the reflected light beam 41 through the aperture 38 when the mirror 36 is in the position at which the scale beam 14 is at the predetermined level, namely horizontal. Preferably a collimating tube 45 is also provided between the aperture 38 and the photoelectric responsive element 44 so as to render the element 44 substantially unresponsive to extraneous light. It will be understood that the walls of the collimating tube 45 are preferably blackened for this purpose.

The photoelectric response element 44 is connected to a suitable amplifier 46 for closing the supply gate 16 when the scale beam 14 has risen to the horizontal position and the mirror 36 is consequently in such a position as to reflect light from the lamp 42 back into the aperture 38 and to illuminate the photoelectric response element 44. It will be understood that, during the time weighing has been done, the scale pan 11 is in the closed position.

The supply gate 16 cannot close until enough material has dropped onto the scale pan 11 to balance the scale beam 14. Thus underweight is avoided. However, the apparatus as thus far described does not necessarily prevent overweight in the event that some material which has already left the supply gate 16 should fall upon the scale pan 11 or the unavoidable inertia of the supply gate 16 in closing should result in a delay in the closing of the gate 16 after actuation of the photoelectric amplifier 46. In order that any such overweight may be measured and recorded, the balance beam apparatus is so constructed that in the event of slight additional weight the balance beam 14 will assume a position slightly above horizontal, the extent of deviation being determined by the extent of overweight. The vertical position of the marking tip 33 with respect to the chart 34 then indicates the actual weight including any such overweight. For producing a record upon the chart 34, a striker 47 is provided for pressing the pennant 31 and the tip 33 against the chart 34 which is composed of pressure sensitive sheet material.

In the apparatus illustrated, the mechanism for causing the position of the balance beam 14 above horizontal to be responsive to any such overweight takes the form of a vertically extending arm 48, preferably threaded, carrying a weight 49 displaced vertically from the horizontal center line of the balance beam 14 so that the center of gravity of the combined structure including the weight 49, the balance beam 14 and other parts carried thereby lies below the center line of the supporting bearing assembly 18, therefore below the pivot axis. In consequence, any lifting of the right hand end of the balance beam 14 above the horizontal position results in the shifting of the center of gravity of the combined balance beam assembly horizontally and the balance beam 14 finds a new balance, slightly different from horizontal, in the event of any overweight. Accordingly the marking tip 33 provides a measure and a record of any such actual weight.

For the purpose of calibrating the mechanism the vertically displaced weight 49 is preferably in the form of a trim weight which may be adjusted vertically upon the transverse rod 48 by rotation in the same manner as the horizontal trim weights 26. Preferably for maintaining the calibration, lock nuts 51 for the horizontal trim weights 26 and a lock nut 52 for the vertical trim weight 49 are provided.

The scale pan assembly 22 includes a cage structure 53 suspended from the rod 23 and carrying a pair of drop leaves 54 pivoted on pins 55 carried at the lower end of the cage structure 53. A suitable means may be employed for opening and closing the leaves 54. In the particular embodiment illustrated a pneumatic pressure cylinder 56 is employed containing a piston having a stem 57 connected through links 58 to the drop leaves 54, whereby application of pneumatic pressure to the lower end of the cylinder 56 lifts the drop leaves 54 against the force of gravity to close the scale pan. A supply line 59 for applying pneumatic pressure to the cylinder 56 is provided which is connected to a source of air pressure 61 through a pressure regulator 62 and a four-way valve 63.

The valve door or supply gate 16 is likewise pneumatically controlled through a line 64 from the four-way valve 63. The operating mechanism for the supply gate or valve door 16 may be similar to that described for the scale pan assembly 22. Since it does not constitute a part of the present invention it is not described in detail. As will be described more fully hereinafter suitable mechanism is employed for operating the four-way valve 63 in accordance with the desired operating cycle.

The invention is not limited to the particular mechanical structure and assembly of the scale pans and support for the scale beam. However, in order to enable various sizes of scale pans for different capacities for fiber supply to be employed with batch weight recorders in accordance with the invention, preferably a double scale beam arrangement is employed with a tie rod 65 connecting the scale beam 14 illustrated in FIG. 1 to a second corresponding scale beam 66 spaced from the scale beam 14 so as to provide an open passageway 67 through which material may fall from the feeder 12 and the supply gate 16 upon the scale pan assembly 11. As shown the path 67 for the falling material is at one side of the tie rod 65. For adapting the apparatus to larger capacities, longer tie rods 65 are substituted together with scale pan assemblies in which the drop leaves 54 are wider in the dimension measured parallel to the tie rod 65. The scale beam 66 is provided with a beam support bearing 68 and a pan support bearing 69 corresponding to the bearings 18 and 25 shown in FIG. 1.

For convenience the vertical trim weight 49 and the supporting rod 48 therefore have been shown as secured to the scale beam 66 although the invention is not limited to this particular arrangement.

Preferably means are provided for damping out oscillations of the scale beams and enabling them to come to rest more quickly. Such means may take the form for example of a dash pot 71 containing a piston 72, secured by a rod 73, a damper clevice 74 and pin 75, to an extension 76 of one of the scale beams, in the arrangement illustrated an extension of the weigh arm 13 of the scale beam 14.

In the arrangement illustrated in FIGS. 1 and 2 an electrical control is preferably employed for the four-way pneumatic valve 63. As shown in the circuit diagram of FIG. 3 suitable solenoid operating coils and relays are connected to a source of current having input terminals 81 and 82. The terminal 82 is connected to a conductor 83 forming a common line. The terminal 81 is connected through a conductor 84 and a main switch 80 to fiber meter control circuits. There is one circuit for each of the fiber meters to be employed in the system. For simplicity in the drawing, only two such circuits have been illustrated although it will be understood that one additional circuit would be employed for each additional fiber meter and its associate fiber supply.

For the apparatus illustrated in FIGS. 1 and 2 there is a selector switch 85 in series with a fiber meter control coil 86. Interposed between the normally open switch 85 and the control coil 86 across conductors 81 and 82 are normally closed contacts 87a and a coil 87 shown in FIGURE 4 energized by the photoelectric amplifier 46. Corresponding to the elements 85, 86, and 87a are elements 85–2, 86–2 and 87a–2 in a parallel circuit controlled by the main switch 80 for a second fiber meter not shown. For any additional fiber meters additional corresponding elements would be provided in parallel.

Also connecting between conductors 83 and 84 are a valve door operating solenoid 88 and normally closed contacts 86a of the fiber meter coil 86. The valve door control coil 88 is so arranged as to close the supply gate 16 when it is energized. This will be described more in detail hereinafter. Preferably it is accomplished through the four-way valve 63 by means of a plunger controlled by the solenoid coil 88. Corresponding elements 88–2 and 96a–2 are connected in parallel with the elements 88 and 86a, respectively for a second fiber meter and associated fiber feeder, and additional such elements would be provided for additional such units. Corresponding parts of the second unit are designated by the same reference numerals with the numeral "–2" added thereto. Moreover, for simplicity an "across the line" circuit diagram is employed with coils of relays designated by reference numerals and contacts operated thereby designated by the same numeral with a letter suffix such as "86a."

In order to enable the chart 34 to be imprinted after the balance beams have come to rest, a printer operating delay circuit is provided which is energized at the same time as the supply gate control solenoid 88. As shown there is a delay circuit 91 connected across the solenoid coil 88. This includes a chart advance solenoid 92, a printing solenoid 93, a relay coil 94 in a time delay circuit and a printing relay coil 95. The chart advancing solenoid 92 is arranged to cock a chart advance ratchet 98 when it is energized. For example as schematically indicated the solenoid 92 may be provided with a plunger 96 carrying a detent 97 cooperating with a ratchet 98 to advance the chart 34 by means of the force of a spring 99 biasing the plunger 96 to a position against the force of attraction of the solenoid 92.

The time delay relay coil 94 is provided with a movable contact 94a cooperating with a normally closed stationary contact 94b and a normally open stationary contact 94c. A time delay occurs after energization of the coil 94 before transfer of the movable contact 94a from the normally closed stationary contact 94b to the normally open stationary contact 94c. The relay coil 95 is part of a standard double-throw single pole relay having a movable contact 95a cooperating with a normally closed stationary contact 95b and a normally open stationary contact 95c.

The time delay circuit 91 includes the common line 83 and a conductor 107 connected on opposite sides of the solenoid coil 88. The advancing solenoid 92 is connected between the conductor 107 and the common line 83 in series with a diode 108, the movable contact 95a of the relay coil 95 and the stationary contact 95b thereof. A diode 109 poled oppositely to the diode 108 is also connected between the moveable contact 95a and the common line 83. The printing solenoid 93 is connected between the common line 83 and the normally open stationary contact 95c of the relay coil 95.

The relay coil 94 is connected between the conductor 107 and the common line 83 through a diode 111, a resistor 112, a resistor 113 and a delay adjusting rheostat 114. There is a condenser 115 connected in parallel with the coil 94 for delaying buildup of current therein. A condenser 116 is connected between the common line 83 and a conductor 117 connected to the junction terminal 118 of the resistors 112 and 113.

The printing relay coil 95 is connected between the common line 83 and the normally open stationary contact 94c of the relay coil 94. The relay coil 94 has its normally closed stationary contact 94b also connected through the conductor 117 to the junction terminal 118 of the resistors 112 and 113 so that the condenser 116 serves to stabilize the voltage between the conductor 83 and the terminal 118. There is a condenser 119 connected between the conductor 83 and the movable contact 94a of the relay 94.

In the normal position of the movable contact 94a the capacitor 119 is being charged by current flow through the diode 111 and the resistor 112 through the normally closed stationary contact 94b. When the relay coil 94 is energized it transfers its movable contact 94a from the stationary contact 94b to the stationary contact 94c, thus energizing the relay coil 95 with the stored energy of the condenser 119. Consequently the relay coil 95 remains energized for a fraction of a second until the energy in the condenser 119 is dissipated.

A separate solenoid 121 is provided for actuating the cylinder 56 of the scale pans to close the scale pans when the coil 121 is energized. It may act by actuating the four-way valve 63. The scale pan closing coil 121 is connected between the common line 83 and the conductor 84 in series with normally open contacts 101a of the relay coil 101. This will be explained more explicitly hereinafter. The coil 101 is energized when the operation is started by the closing of a selector switch 85 but is not deenergized to cause the scale pans to open until after sufficient time delay has taken place to enable the scale pans to come to rest and the printing has been performed. Furthermore, if it is desired to employ the system of operation of the aforesaid United States Patent 2,703,438 or that of British specification 977,615, means are provided also for preventing any of the scale pans of a system from opening until after all the scale pans for the various feeders and fiber meters for the system have been filled up. For controlling the relay coil 101 the time delay relay coil 94 is provided with a normally open contact 94d in series with relay coil 102, across the lines 83 and 84, the relay coil 102 having normally closed contacts 102a in series with the relay coil 101.

If it is desired to have the scale pans remain closed until all of them have been filled up, normally open contacts of time delay relay in additional fiber meters corresponding to the time delay relay 94 are connected in series with the relay coil 102. For example, as shown in FIG. 3 there are normally open contacts 94d-2 of a coil 94-2 (not shown) in a delay circuit 91-2 of a second fiber meter and if there are additional fiber meters, additional such normally open contacts are also connected in series with the relay coil 102.

For such a system where it is desired to have all of the scale pans remain closed until all of them have been filled up, the relay coil 102 is provided with normally closed contacts for each of the fiber meters and associated feeders such as 102a in series with the coil 101, 102b in series with a coil 101-2, and additional such normally closed contacts in series with additional relay coils of additional units of the system. Thus it is necessary for all of the scale pans to have come to balance and to have energized their relays 94 before a complete circuit can take place through the relay coil 102 to deenergize the coils 101, 101-2 and so forth, to deenergize the scale pan closing solenoids 121, 121-2 and so forth, to permit the scale pans to open. According to the operation desired the selector switches 85 and 85-2 may be closed simultaneously or in accordance with a prearranged program.

The system is designed to perform continuous batch weighing and weight recording of any light material such as textile fibers. After selection of the weight of material by the operator, the equipment will weigh and record the quantity in ounces after which it will empty, refill, weigh and record succeeding quantities in a continuous cycle. To set the system in operation the main switch 80 is closed. Then depending upon which of the fiber meters is to be operated, first one or the other of the selector switches 85 or 85-2 is closed. Conventional mechanism not shown is provided for closing such selector switches in succession or according to any desired program, in order to discharge the measured batches of fiber to a moving conveyor 103 in separate batches or in sandwich form or the like as desired as described in aforesaid Patent No. 2,703,438 and British specification No. 977,-615. Since the operation of the system is the same for all of the fiber meters of the system, the operation will be explained for only one, namely that controlled by the selector switch 85, the coil 86 and the normally closed contacts 87a.

When selector switch 85 is closed, a circuit is formed through the normally closed contacts 87a and the coil 86 from the power supply terminal 81 to the second power supply terminal 82. Accordingly the coil 86 is energized so as to open its normally closed contacts 86a and to permit the supply gate 16 to open. There is also a circuit between lines 83 and 84 through the relay coil 101 and the normally closed contacts 102a, which energizes the coil 101 and closes the contacts 101a. Consequently, the scale pan is kept closed by the energization of the pan closing solenoid 121. Thus with the scale pan closed and the supply gate open material starts filling the weigh box. As the preset weight is approached the balance beam 14 moves to the balanced position, the mirror 36 reaches the point at which the light beam is reflected into the aperture for illuminating the photoelectric response element 44. This acts through amplifier 46 to energize the coil 87 which opens the normally closed contacts 87a.

In consequence the coil 86 is deenergized allowing the normally closed contacts 86a to close, energizing the valve door solenoid 88 and closing the supply gate 16. The energization of the solenoid 88 also energizes the circuit 91 so as to energize the chart advancing solenoid 92, which retracts its plunger 96 carrying a detent 97 so as to cock the ratchet 98 against the force of the spring 99. Simultaneously a circuit is formed through the diode 111, the resistor 112, conductor 117 and the condenser 116 to charge the condenser to the potential corresponding to the peak value of the terminals 81 and 82. Also simultaneously a circuit is formed through the diode 111, the resistor 112, the resistor 113, the delay adjusting rheostat 114 and the time delay relay coil 94.

After a predetermined time delay determined by the capacitance of the parallel condenser 115 and the resistance of the elements 112, 113 and 114 and which may be set by adjustment of the rheostat 114, the time delay relay coil 94 moves the movable contact 94a from contact with the stationary contact 94b to contact with the stationary contact 94c. In consequence the relay coil 95 is connected across the now charged condenser 119 through the contacts 94a and 94c. The pulse of current flowing through the relay 95 transfers its movable contact 95a to connection with the normally open stationary contact 94c so as to close a circuit from the power supply terminal 81, through the main switch 80, conductor 84, normally closed contacts 86a, the conductor 107, the diode 108, the movable contact 95a, stationary contact 95c and the printing solenoid 93 back to the common line 83 and the power supply terminal 82. Energization of the printing solenoid rotates the striker 47 so as to strike the pennant 31 and drive the marking tip 33 against the chart 34, producing a mark on the chart 34 and a record of the vertical position of the marking tip 33. This represents the actual level of the balance beam 14 and the actual weight in the scale pan assembly 22.

The printing relay 95 having been energized only by the current discharge from the condenser 119 acts only momentarily and permits its contacts 95a and 95c to reopen after the striker has acted. The time delay which has taken place from the closure of the supply gates 16 until the action of the striker 47 has allowed the oscillation of the scale beam 14 to be damped out by the damper assembly within the dash pot cylinder 71 so that the mark of the recorder stylus on the chart represents the balance position.

The momentary opening of the contacts 95a and 95b has deenergized the chart advancing solenoid 92 to permit the cocking spring 99 to retract the plunger 96 and cause the detent 97 to rotate the ratchet 98 for advancing the chart.

The actuation of the relay 94 has also closed its normally open contacts 94d. After the same action has taken place in other fiber meters of the system, also closing corresponding normally open contacts 94d–2, etc. of the other units, a circuit is formed between conductors 83 and 84 through the relay coil 102, and contacts 94d, 94d–2, etc. energizing the coil 102. This opens the normally closed contacts 102a, deenergizing the relay coil 101 to permit its contacts 101a to reopen and deenergize the scale pan closing solenoid 121. Consequently the scale pans open.

Thereupon the balance beam 14 becomes out of balance moving the mirror 36 to a position in which light is cut off from the photoelectric response element 44. This deenergizes the photoelectric amplifier 46 and the coil 87 so as to allow the contacts 87a to be closed. Assuming that the selector switch 85 has remained closed, or in accordance with a predetermined program closes again, the cycle just described is repeated and another quantity of material is weighed out and discharged. It will be understood that the discharged material will be transferred by the conveyor 103 or other means to the point which it is to be utilized.

Owing to the fact that the bearing assemblies 18, 25, 68, and 69 comprise cylindrical race ball bearings mounted within spherical bearings, the balance beams are self-aligning and the beams and the scale pan assembly pivot freely without binding and without introduction of friction when the apparatus is subjected to jolting or vibration. The employment of a unitary photoelectric response mechanism mounted within a casing containing both a light source and a photoelectric responsive element eliminates the need for mirrors, blinds, or shades that are actuated through mechanical means. There are no inertia-bearing, mechanical components which tend to affect the precision of the device by reason of friction in them. The photoelectric response unit is isolated from the weighing mechanism and it imposes no friction that might affect the recorded weight of stock.

A chart holding lock located within the recorder permits fast trouble-free installation of new charts when the previous charts have been completely used.

The printing is accomplished by a stylus which is fastened to the scale beam and is entirely free and separate from the recorder, eliminating any need for friction or inertia containing linkages.

As shown in FIG. 5 the bearing assembly 18 comprises a mounting 122 for a ball bearing 123. In order that the mounting 122 may be freely movable about a center point of rotation at the center of the cylindrical race ball bearing 123, the mounting 122 has a spherical outer surface operating with a ball race 124 carried within a cylindrical opening 125 formed in the upper end of the bearing supporting post 19. The race 125 also has a spherical inner surface concentric with the outer surface of the mounting 122 and preferably is grooved to receive miniature ball bearings 126.

There is a pivot pin 127 fitting in the scale beam 14 at one end and within the inner race of the ball bearing 123 at the opposite end. The outer race of the ball bearing 123 is secured against axial movement in the mounting 122 by means of an inside spacer 128 and an outside spacer and cap 129. The outer surfaces of the spacers 128 and 129 and of the outer race of the ball bearing 123 are cylindrical to fit within a cylindrical bore 131 in the spherical mounting member 122. It will be understood that preferably the outer race of the roller bearing 123 makes a push fit within the bore 131 with the spacers 128 and 129 either having a drive fit or being otherwise secured within the bore 131.

Accordingly the pivot pin 127 and the scale arm 13 are freed from any tendency to be subject to friction by binding of the races in the ball bearing 123 in case the bearing assembly should become slightly misaligned during the erection of the apparatus or by vibration of the machinery. The pivot pin 127 is free to revolve in any direction around its center point as a result of the spherical configuration of the mounting members 122 and 124. A similar construction is employed for the other bearing assemblies 25, 68 and 69.

We claim:

1. A weight recorder comprising in combination:
a scale pan adapted to receive material to be weighed,
a printer movable along a predetermined path in accordance with variations in weight of material on the scale pan and also movable transversely to said predetermined path,
a recorder chart, and
means for driving the printer transversely for producing printing relationship between the printer and the chart.

2. A recorder as in claim 1 including:
means positioned to discharge material to be weighed to the scale pan, and
means responsive to a predetermined position of the printer for closing access to the scale pan of additional material from said discharge means.

3. A recorder as in claim 2 in which the transversely moving means for the printer comprises means for producing contact between the printer and the chart in synchronism with the means responsive to the predetermined position of the printer.

4. A recorder as in claim 3 including a pivotally mounted scale beam having a free end, wherein the scale pan is supported by a scale beam and the printer is supported by the free end of the scale beam with the means responsive to position of the printer located to detect attainment of a predetermined position by the scale beam.

5. A recorder as in claim 4 wherein the means for detecting attainment of a predetermined position by the scale beam constitutes photoelectric responsive mechanism mounted in a stationary position beside the free end of the scale beam.

6. A weight recorder comprising in combination:
a pivotally mounted scale beam having a free end,
a scale pan supported by said scale beam and adapted to receive material to be weighed,
a printer supported by the free end of the scale beam and movable in accordance with variations in weight of material on the scale pan,
a recorder chart,
means for producing printing relationship between the printer and the chart,
means positioned to discharge material to be weighed to the scale pan,
photoelectric mechanism responsive to a predetermined position of the printer for closing access to the scale pan of additional material from said discharge means,
means for producing contact between the printer and the chart in synchronism with the means responsive to a predetermined position of the printer, said photoelectric response mechanism being mounted in a stationary position beside the free end of the scale beam to detect attainment of a predetermined position by the scale beam, and comprising a housing containing a light source and a photoelectric element with an aperture in the housing for a beam of light from the light source to leave the housing and a second aperture in the housing for a reflected light beam to re-enter the housing and impinge upon the photoelectric element, the scale beam carrying a mirror in such angular relation to the scale beam as to reflect a beam of light from the first aperture into the second aperture against the photoelectric element at a predetermined angular position of the scale beam.

7. A recorder as in claim 6 wherein the scale beam is provided with a horizontally adjustable trim weight for adjusting the weight of material in the scale pan at which the scale beam will be in balance and will tend to rest at a position in which the beam of light from the light source impinges upon the photoelectric responsive device.

8. A recorder as in claim 7 wherein the scale beam has a beam supporting pivot and normally occupies a substantially horizontal position with an arm extending in one direction from the pivot carrying the horizontally adjustable trim weight, and the scale beam has an arm carrying a weight extending in a substantially vertical direction whereby deviations from horizontal of the scale beam cause the center of gravity thereof to move horizontally and enable slight variations in weight of material in the scale pan to cause balance of the scale beam to take place at positions deviating slightly from horizontal according to such variations in weight of material in the scale pan.

9. A recorder as in claim 8 wherein the vertically extending weight is vertically adjustable in the form of a vertical trim weight for enabling the printer and chart to be calibrated in terms of variations in angular balance position of the scale beam.

10. A recorder as in claim 9 wherein the means for producing printing relationship between the printer and the chart comprises a striker for pressing the printer against the chart.

11. A recorder as in claim 10 wherein the striker includes means for actuating it in response to illumination of the photoelectric element.

12. A recorder as in claim 11 wherein a delay mechanism is interposed between the photoelectric responsive device and the striker for enabling the scale beam to come substantially to rest before operation of the striker.

13. Apparatus as in claim 12 wherein the scale pan is adapted to be opened and is provided with opening mechanism actuated in response to completion of a chart printing operation.

14. Apparatus as in claim 13 wherein the chart comprises a pressure sensitive material and the printer comprises a stylus with a point adapted to be pressed against the chart.

15. Apparatus as in claim 14 wherein the striker is provided with a solenoid for actuating it.

16. Apparatus as in claim 15 wherein the delay mechanism comprises an electrical delay circuit energized in synchronism with the actuation of the means for closing access of the material to the weigh pan, a condenser connected to said circuit so as to be charged when said circuit is energized, and a printing solenoid for actuating said recorder striker with means for discharging said condenser and energizing said printing solenoid upon termination of the delay period of the delay circuit, whereby momentary actuation of the striker is produced.

17. Apparatus as in claim 16 wherein the delay circuit includes a relay with delayed actuation, a printing relay having a winding adapted to be connected across said condenser upon actuation of the time delay relay, and the printing solenoid is energized from said circuit when the printing relay is energized, whereby energization of the printing relay termnates upon discharge of the condenser and momentary actuation of the striker is produced.

18. Apparatus is in claim 17 wherein the chart is provided with advancing mechanism including an advancing solenoid and the printing relay has a pair of stationary contacts and a movable contact, the first stationary contact being normally closed and the second stationary contact being normally open, the first contact being in series with the advancing solenoid and the second in series with the printing solenoid.

19. Apparatus as in claim 18 wherein a scale beam pivot is employed which comprises a cylinder bearing mounted within a spherical bearing.

20. A recorder as in claim 19 wherein the means for supplying material to the scale pans constitutes a textile fiber feeder and is mounted in conjunction with a plurality of feeders in a fiber blending system and the recorder provides a record of the fiber blend produced by the system.

21. A recorder as in claim 20 wherein a second scale beam is provided connected to the first scale beam by a horizontal tie rod so positioned in relation to the scale pan and the means for discharging material to be weighed that the path of the discharged material lies to one side of the tie rod and between the scale beams.

22. Apparatus as in claim 21 wherein the scale beams are provided with pan supporting pivots on substantially horizontal arms and the scale pan is suspended from such pivots.

23. Apparatus as in claim 22 wherein a dash pot is provided with a piston connected to one of the scale beams for damping out fluctuations of the scale beams.

24. Apparatus as in claim 23 wherein the electrical delay circuit includes a time delay relay having normally closed contacts connecting said condenser in the circuit and normally open contacts for discharging said condenser when said normally open contacts are closed and energizing the printing solenoid.

25. Apparatus as in claim 24 wherein the time delay relay is connected in the time delay circuit in series with resistance and has a condenser connected across it for delaying the buildup of current in the time delay relay coil.

26. A recording textile fiber blender comprising in combination:

a scale beam having a pivotal beam support with an arm extending in one direction from said support pivotally supporting a scale pan and an arm extending in the opposite direction from the pivotal support carrying a balance weight and a printing point, a fiber feeder mounted above the scale pan adapted to discharge thereto, a valve door mounted between the feeder and the scale pan for controlling discharge of fiber to the scale pan, photoelectric response mechanism mounted beside the scale beam arm carrying the printing point, a mirror also mounted upon the scale beam arm, said photoelectric response mechanism including:

a light source adapted to project a light beam against the mirror, and a photoelectric response element adapted to receive a reflected light beam from the mirror when the scale beam attains a predetermined position, a pressure sensitive chart mounted in operative relationship to said printing point, a circuit adapted to be energized in response to illumination of said photoelectric response element, said circuit including means for closing said valve door and pressing said printing point against said chart and means for advancing the chart after the printing point has been momentarily pressed against the chart whereby a record is produced of the weight of material deposited upon the scale pan, the scale pan supporting arm of said scale beam carrying a vertically displaced weight whereby variations in angular positions of the scale beam produce variations in the center of gravity thereof with respect to the pivot point, and the balance position of the scale beam for different deviations in weight of material upon the scale pan occurs at various points displaced from the horizontal position of the scale beam.

References Cited

UNITED STATES PATENTS

| | | | |
|---|---|---|---|
| 2,559,307 | 7/1951 | Martinson | 177—62 |
| 2,597,831 | 5/1952 | Willis | 177—60 |
| 2,995,783 | 8/1961 | Lytton | 177—114 |
| 3,106,978 | 10/1963 | Cahn | 177—210 |
| 3,123,164 | 3/1964 | Echenique | 177—3 |
| 3,154,161 | 10/1964 | Russell | 177—178 |
| 3,202,230 | 8/1965 | Brichard | 177—64 |
| 3,370,662 | 2/1968 | Eisner | 177—60 |

FOREIGN PATENTS 369,369  3/1932  Great Britain.

ROBERT S. WARD, Jr., *Primary Examiner.*

LAWRENCE H. HAMBLEN, *Assistant Examiner.*

U.S. Cl. X.R.

177—4, 60, 210, 246